United States Patent
Tu et al.

(10) Patent No.: US 9,781,412 B2
(45) Date of Patent: Oct. 3, 2017

(54) CALIBRATION METHODS FOR THICK LENS MODEL

(71) Applicant: SONY CORPORATION, Tokyo (JP)

(72) Inventors: Xue Tu, Fremont, CA (US); Pingshan Li, Sunnyvale, CA (US); Alexander Berestov, San Jose, CA (US)

(73) Assignee: Sony Corporation, Tokyo (JP)

( * ) Notice: Subject to any disclaimer, the term of this patent is extended or adjusted under 35 U.S.C. 154(b) by 141 days.

(21) Appl. No.: 14/614,268

(22) Filed: Feb. 4, 2015

(65) Prior Publication Data

US 2016/0227206 A1 Aug. 4, 2016

(51) Int. Cl.
*H04N 17/00* (2006.01)
*G01B 9/00* (2006.01)
*G02B 15/14* (2006.01)
*G06T 7/80* (2017.01)

(52) U.S. Cl.
CPC ............ *H04N 17/002* (2013.01); *G06T 7/80* (2017.01)

(58) Field of Classification Search
CPC .... G06T 7/0018; H04N 17/002; G03B 43/00; G03B 2205/0046; G02B 7/04; G02B 15/00
USPC .......... 348/187, 240.3; 356/124, 239.2, 676; 3/187, 240.3; 359/676
See application file for complete search history.

(56) References Cited

U.S. PATENT DOCUMENTS

| | | | |
|---|---|---|---|
| 5,004,346 A | 4/1991 | Kuhel | |
| 5,034,768 A * | 7/1991 | Miyadera | G02B 7/32 396/106 |
| 7,161,741 B1 | 1/2007 | Schaack | |
| 7,490,019 B2 | 2/2009 | Fukumoto et al. | |
| 8,496,329 B2 | 7/2013 | Spivey et al. | |
| 8,619,144 B1 * | 12/2013 | Chang | H04N 17/002 348/180 |
| 2005/0212950 A1 * | 9/2005 | Kanai | H04N 5/23212 348/345 |
| 2007/0296823 A1 * | 12/2007 | Chen | H04N 5/23203 348/211.99 |
| 2010/0283856 A1 | 11/2010 | Kahler et al. | |
| 2010/0295948 A1 * | 11/2010 | Xie | G06T 7/0018 348/175 |
| 2011/0194851 A1 * | 8/2011 | Hjelmstrom | G03B 7/095 396/242 |
| 2012/0155849 A1 * | 6/2012 | Nakashima | G03B 7/26 396/301 |

(Continued)

FOREIGN PATENT DOCUMENTS

| WO | 2008076399 A2 | 6/2008 |
|---|---|---|
| WO | 2010034502 A2 | 4/2010 |

OTHER PUBLICATIONS

Philpot (Photogrammetry, Cornell University, Fall 2012) http://ceeserver.cee.cornell.edu/wdp2/cee6100/6100_monograph/mono_07_F12_photogrammetry.pdf.*

(Continued)

*Primary Examiner* — Xi Wang
(74) *Attorney, Agent, or Firm* — Haverstock & Owens LLP

(57) ABSTRACT

The thick lens calibration method enables better calibration of complex camera devices such as devices with thick lens systems. The thick lens calibration method includes a two step process of calibrating using the distance between a second nodal point and an image sensor, and calibrating using the distance between the first and second nodal point.

24 Claims, 14 Drawing Sheets

(56) References Cited

U.S. PATENT DOCUMENTS

2012/0310141 A1    12/2012    Kornfield et al.

OTHER PUBLICATIONS

Aloimonos (Image processing-camera calibration, Fall 2013)https://www.cs.umd.edu/class/fall2013/cmsc426/lectures/camera-calibration.pdf.*
Jones (Purdue University, physics 42200, lecture 32, spring 2013) http://www.physics.purdue.edu/~jones105/phys42200_Spring2013/notes/Phys42200_Lecture32.pdf.*

* cited by examiner

CALIBRATION METHODS FOR THICK LENS MODEL

FIELD OF THE INVENTION

The present invention relates to digital cameras. More specifically, the present invention relates to calibration of digital cameras.

BACKGROUND OF THE INVENTION

In most computer vision applications, the camera is modeled as a pinhole or thin lens model, where objects are able to be focused on no matter where they are placed, and the image is focused at the focal length. However, many high end cameras are equipped with complex lenses, which are not able to be simplified as pinhole.

SUMMARY OF THE INVENTION

The thick lens calibration method enables better calibration of complex camera devices such as devices with thick lens systems. The calibrated lens parameters are able to be useful in different applications. For example, in stereo or structure from motion application, where inverse projection is performed, the difference between sensor distances and nodal point distances is compensated, and the calibration result is able to provide that.

In one aspect, a method programmed in a non-transitory memory of a device comprises calibrating the device using a first distance between a second nodal point and an image sensor and calibrating the device using a second distance between a first nodal point and the second nodal point. The calibrating further comprises taking a picture of a checkerboard pattern. The calibrating further comprises calculating a magnification factor by measuring a distance of two corner points on a real checkerboard and an image of the checkerboard. Corner detection is used to locate a rough position of the corners. Calibrating further comprises calculating the first distance between the second nodal point and the image sensor using the magnification factor. Calibrating further comprises fitting a linear curve to calibrate all of the sensor distances corresponding to each depth of field. Calibrating further comprises utilizing a distance relationship, where there is a same object position but different lens settings. Calibrating further comprises utilized a magnification factor, a distance to an object, and calibration information. The magnification factor is calculated using a checkerboard object at a certain distance and taking pictures with different lens settings, and the magnification factor is calculated by measuring distances between circle centers. Measuring the distances between circle centers includes cropping out a patch that contains a circle, the patch is convolved with itself, a position of the maximal convolution result is determined, and a distance between the circle centers is measured. Calibrating further comprises calculating the second distance between the first nodal point and the second nodal point using a distance of an object, a calibrated quantity and a calculated quantity. Calibrating further comprises taking an average of second distances calculated and generating a final result.

In another aspect, a system comprises a lens, an image sensor configured for acquiring an image and a processing component configured for calibrating the system using a first distance between a second nodal point and the image sensor, and calibrating the system using a second distance between a first nodal point and the second nodal point. The calibrating further comprises taking a picture of a checkerboard pattern. The calibrating further comprises calculating a magnification factor by measuring a distance of two corner points on a real checkerboard and an image of the checkerboard. Corner detection is used to locate a rough position of the corners. Calibrating further comprises calculating the first distance between the second nodal point and the image sensor using the magnification factor. Calibrating further comprises fitting a linear curve to calibrate all of the sensor distances corresponding to each depth of field. Calibrating further comprises utilizing a distance relationship, where there is a same object position but different lens settings. Calibrating further comprises utilized a magnification factor, a distance to an object, and calibration information. The magnification factor is calculated using a checkerboard object at a certain distance and taking pictures with different lens settings, and the magnification factor is calculated by measuring distances between circle centers. Measuring the distances between circle centers includes cropping out a patch that contains a circle, the patch is convolved with itself, a position of the maximal convolution result is determined, and a distance between the circle centers is measured. Calibrating further comprises calculating the second distance between the first nodal point and the second nodal point using a distance of an object, a calibrated quantity and a calculated quantity. Calibrating further comprises taking an average of second distances calculated and generating a final result.

In another aspect, a camera device comprises a lens, a sensor configured for acquiring an image, a non-transitory memory for storing an application, the application for calibrating the system using a first distance between a second nodal point and the image sensor and calibrating the system using a second distance between a first nodal point and the second nodal point and a processing component coupled to the memory, the processing component configured for processing the application. The calibrating further comprises taking a picture of a checkerboard pattern. The calibrating further comprises calculating a magnification factor by measuring a distance of two corner points on a real checkerboard and an image of the checkerboard. Corner detection is used to locate a rough position of the corners. Calibrating further comprises calculating the first distance between the second nodal point and the image sensor using the magnification factor. Calibrating further comprises fitting a linear curve to calibrate all of the sensor distances corresponding to each depth of field. Calibrating further comprises utilizing a distance relationship, where there is a same object position but different lens settings. Calibrating further comprises utilized a magnification factor, a distance to an object, and calibration information. The magnification factor is calculated using a checkerboard object at a certain distance and taking pictures with different lens settings, and the magnification factor is calculated by measuring distances between circle centers. Measuring the distances between circle centers includes cropping out a patch that contains a circle, the patch is convolved with itself, a position of the maximal convolution result is determined, and a distance between the circle centers is measured. Calibrating further comprises calculating the second distance between the first nodal point and the second nodal point using a distance of an object, a calibrated quantity and a calculated quantity. Calibrating further comprises taking an average of second distances calculated and generating a final result.

DETAILED DESCRIPTION OF THE PREFERRED EMBODIMENT

A method to calibrate camera parameters when the parameters are modeled as a thick lens is described. In some embodiments, the method is a two-part implementation—a first part to calibrate the distance between a second nodal point and an image sensor, and a second part to calibrate the distance between the first and second nodal point.

The thick lens model is able to better model the lens system where, under different settings, lens elements move in order to focus at different distances. When the lens system focuses at different depths of field, there is a specific distance between the image sensor and the second nodal point, and between two nodal points. The calibration method described herein provides an effective way to retrieve both distances.

The calibrated lens parameters are able to be useful in different applications. For example, in stereo or structure from motion application, where inverse projection is performed, the difference between sensor distances and nodal point distances is compensated, and the calibration result is able to provide that.

Figure 1:
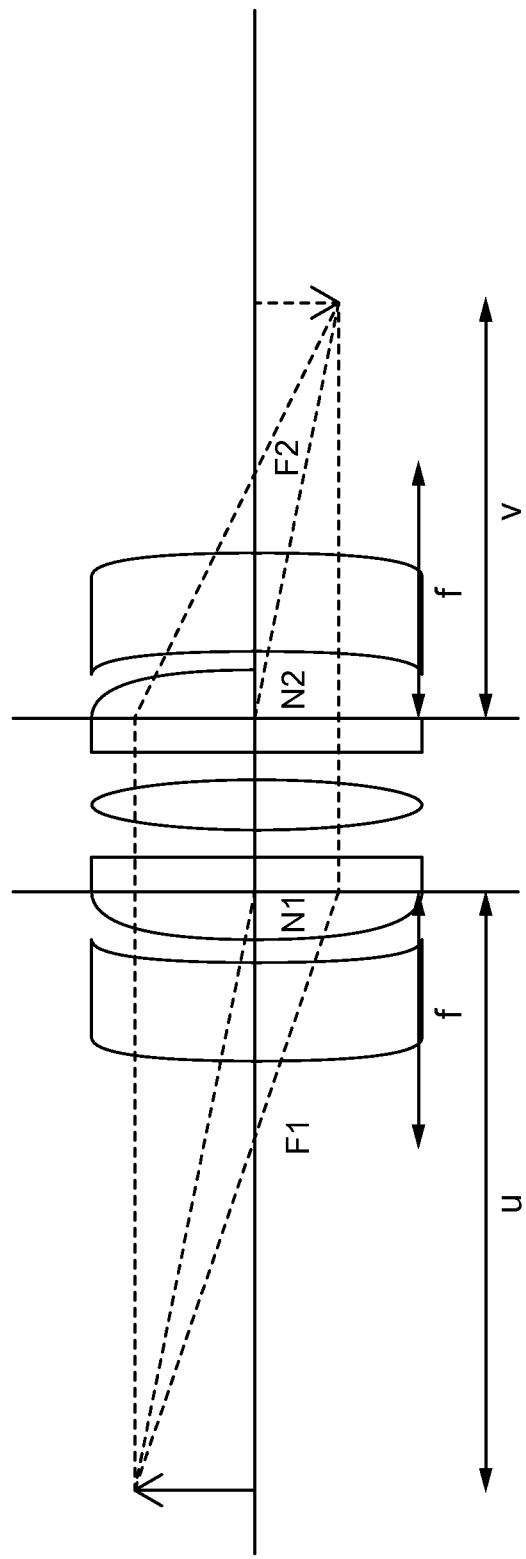
FIG. 1 illustrates a diagram of a thick lens model according to some embodiments.

For complex lens systems in modern cameras, the pin hole model is not sufficient. Lenses move to focus on objects at different distances. FIG. 1 illustrates a diagram of a thick lens model according to some embodiments. The lens formula is: $1/f = 1/u + 1/v$. The parameters include: f: focal length, u: distance between object and first nodal point, v: distance between image and second nodal point, F1 and F2 are focal points and N1 and N2 are nodal points.

Figure 2:
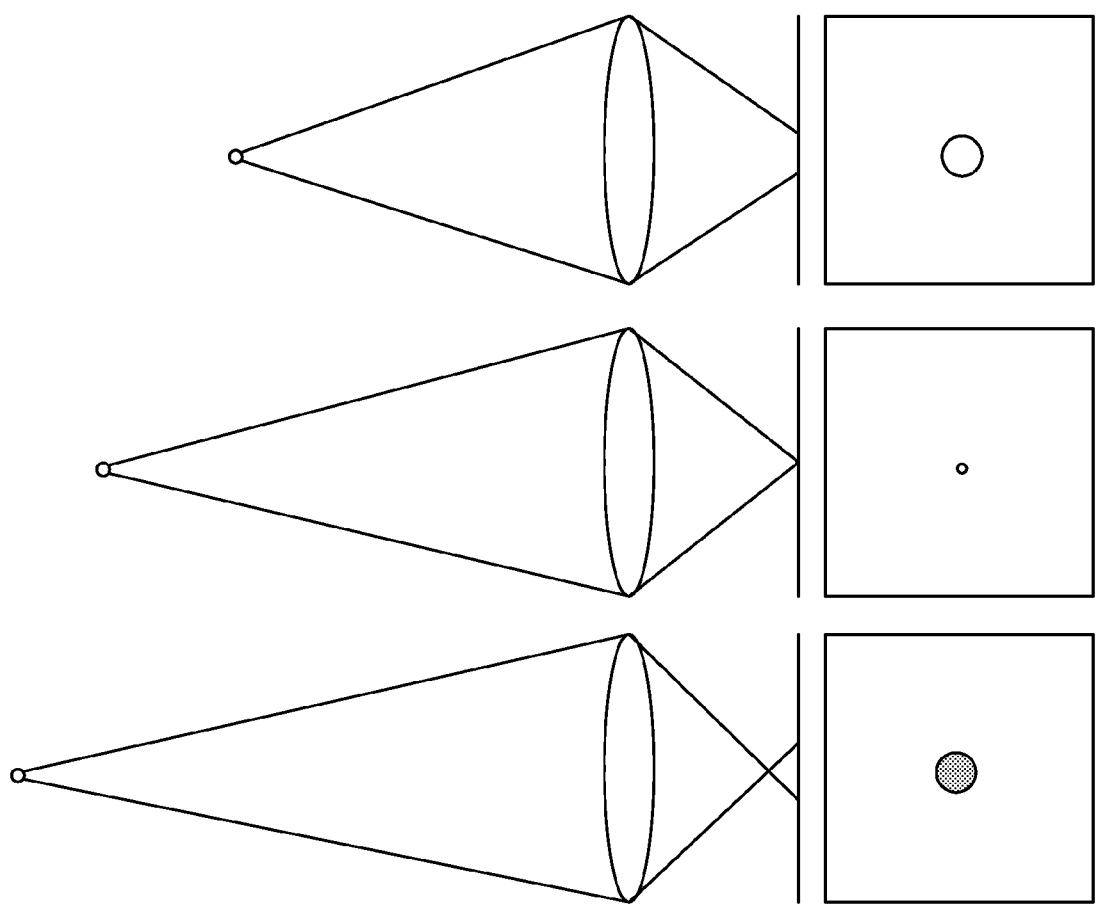
FIG. 2 illustrates diagrams related to depth of focus according to some embodiments.
Figure 3:
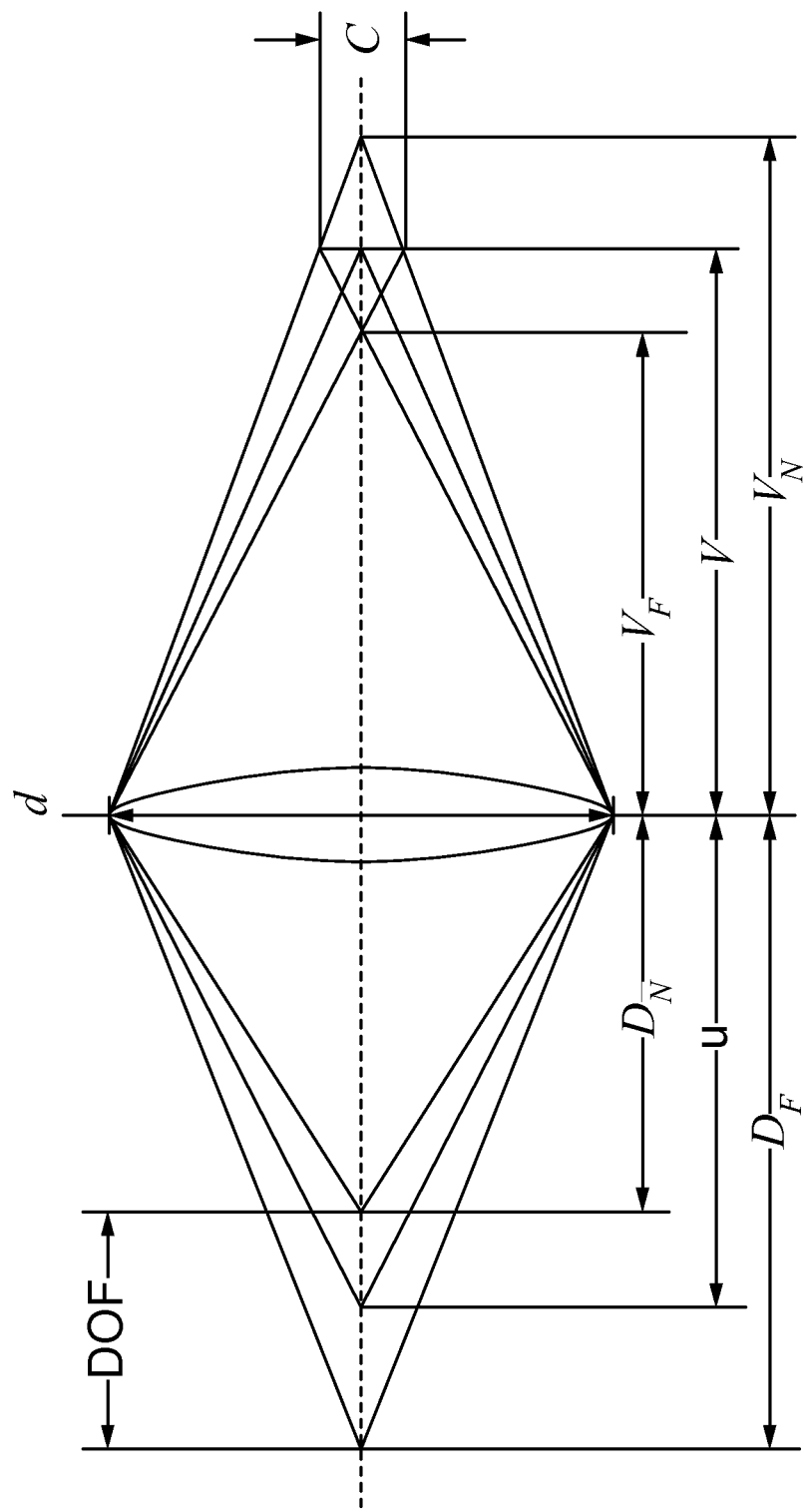
FIG. 3 illustrates a diagram of depth of field according to some embodiments.

In optics, a circle of confusion is an optical spot caused by a cone of light rays from a lens not coming into a perfect focus when imaging a point source. The depth of field is the region where the circle of confusion is less than the resolution of the human eye (or of the display medium). For each depth of field, the lens has a corresponding distance between the image sensor and the second nodal point. FIG. 2 illustrates diagrams related to depth of focus according to some embodiments. The subject, at distance u, is in focus at image distance v. Point objects at distances $D_F$ and $D_N$ are imaged as blur spots. When the blur spot diameter is equal to the acceptable circle of confusion, the near and far limits of depth of field are at $D_F$ and $D_N$. FIG. 3 illustrates a diagram of depth of field according to some embodiments.

Figure 4:
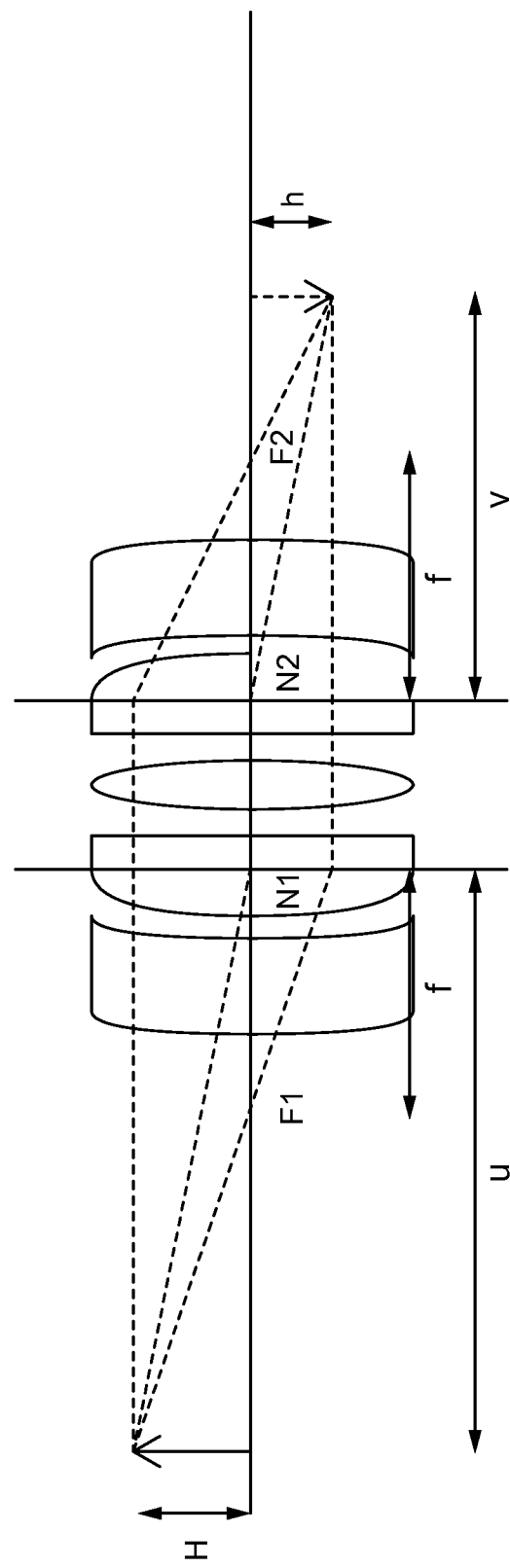
FIG. 4 illustrates a diagram of a thick lens model according to some embodiments.

As shown in FIGS. 2 and 3, for each depth of field, the lens system has a corresponding setting, where the lenses move to change the distance between the distance between the second nodal point and the image sensor. The calibration is to find the distance v, in FIG. 4. From similar triangles, $H/u = h/v$, and magnification factors are termed as $m = H/h = u/v$, hence $u = mv$. H is the height of the object, and h is the size of object in the image.

Figure 5:
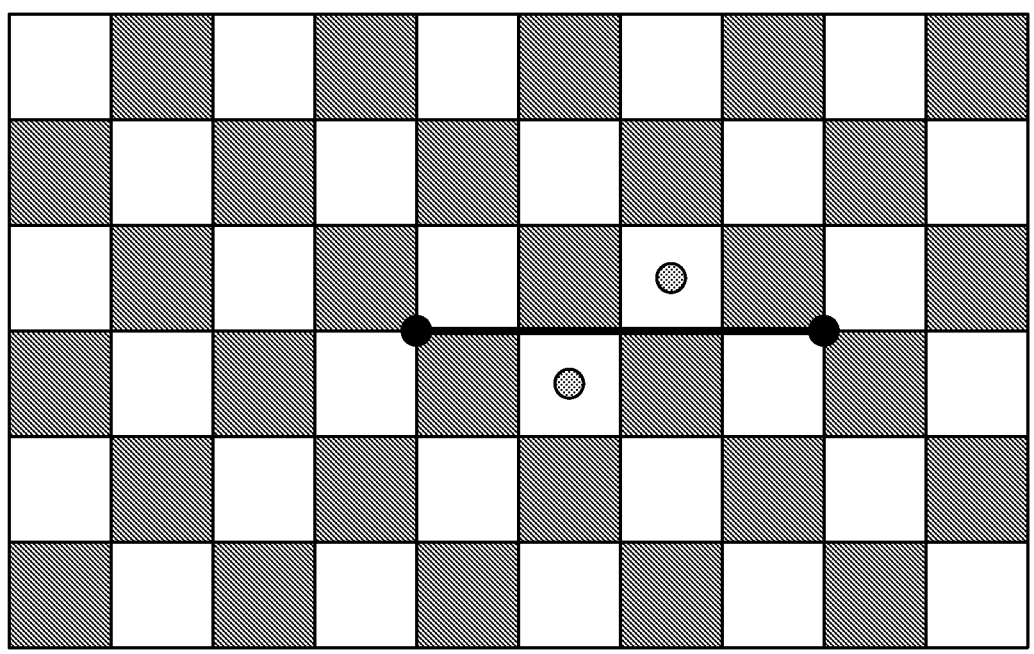
FIG. 5 illustrates a picture of a checker board pattern according to some embodiments.

In a first calibration, a picture is taken of a checker board pattern, as shown in FIG. 5. Then, the magnification factor m is calculated by measuring distances of two corner points on the real checkerboard and the image of the checkerboard. From FIG. 4, $u = mv$. Then, v is able to be calculated through substituting parameters in the lens formula: $1/f = 1/u + 1/v$, then $1/f = 1/(mv) + 1/v$, then v is solved. For example, f is able to be known such as 35 mm.

Figure 6:
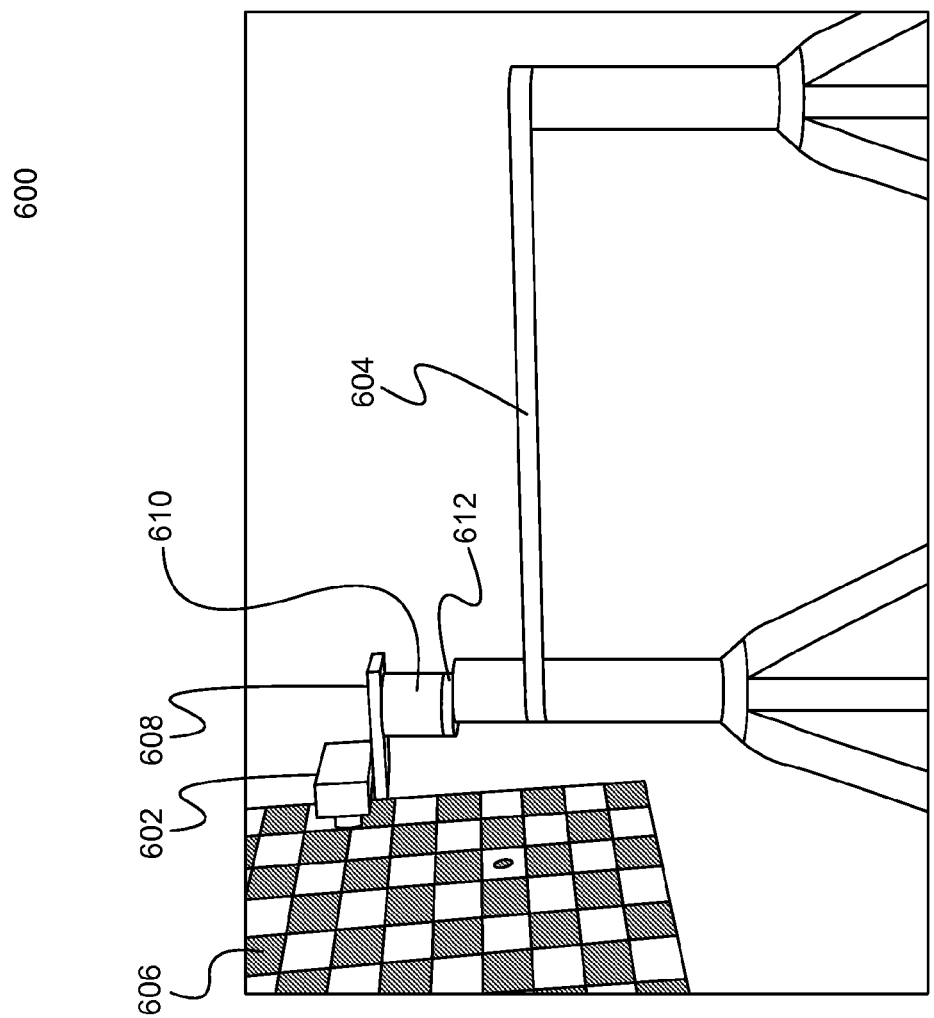
FIG. 6 illustrates a diagram of an exemplary system setup for determining the calibration parameters according to some embodiments.
Figure 6:
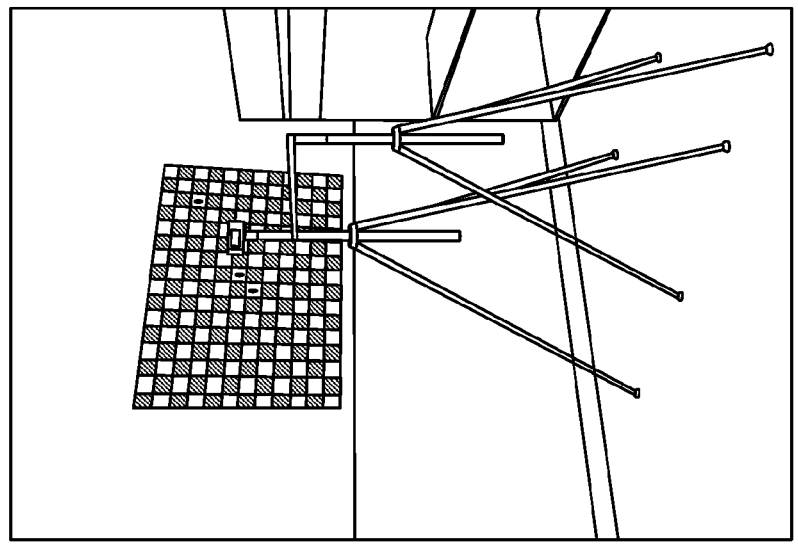

FIG. 6 illustrates a diagram of an exemplary system setup for determining the calibration parameters according to some embodiments. The system 600 includes a camera 602 is placed on a slider 604 to be placed at different distances to the checkerboard object 606. At each position, the object is taken with the camera 602 different lens settings. A lens setting is a specific positioning of the lens component and sensor, such that the lens is able to focus on an object within a specific depth of field perfectly on the sensor. The system 600 is also able to include a mini slider 608, a panning clamp 610 and a leveler 612. The mini slider 608 is able to used to make minor adjustments to the position (e.g., forward and backward) of the camera 602. The panning clamp 610 is able to be used to rotate the camera 602 on the horizontal plane. The leveler 612 is able to be used to ensure the camera is level 612. The system 600 is able to include fewer or additional components.

Figure 7:
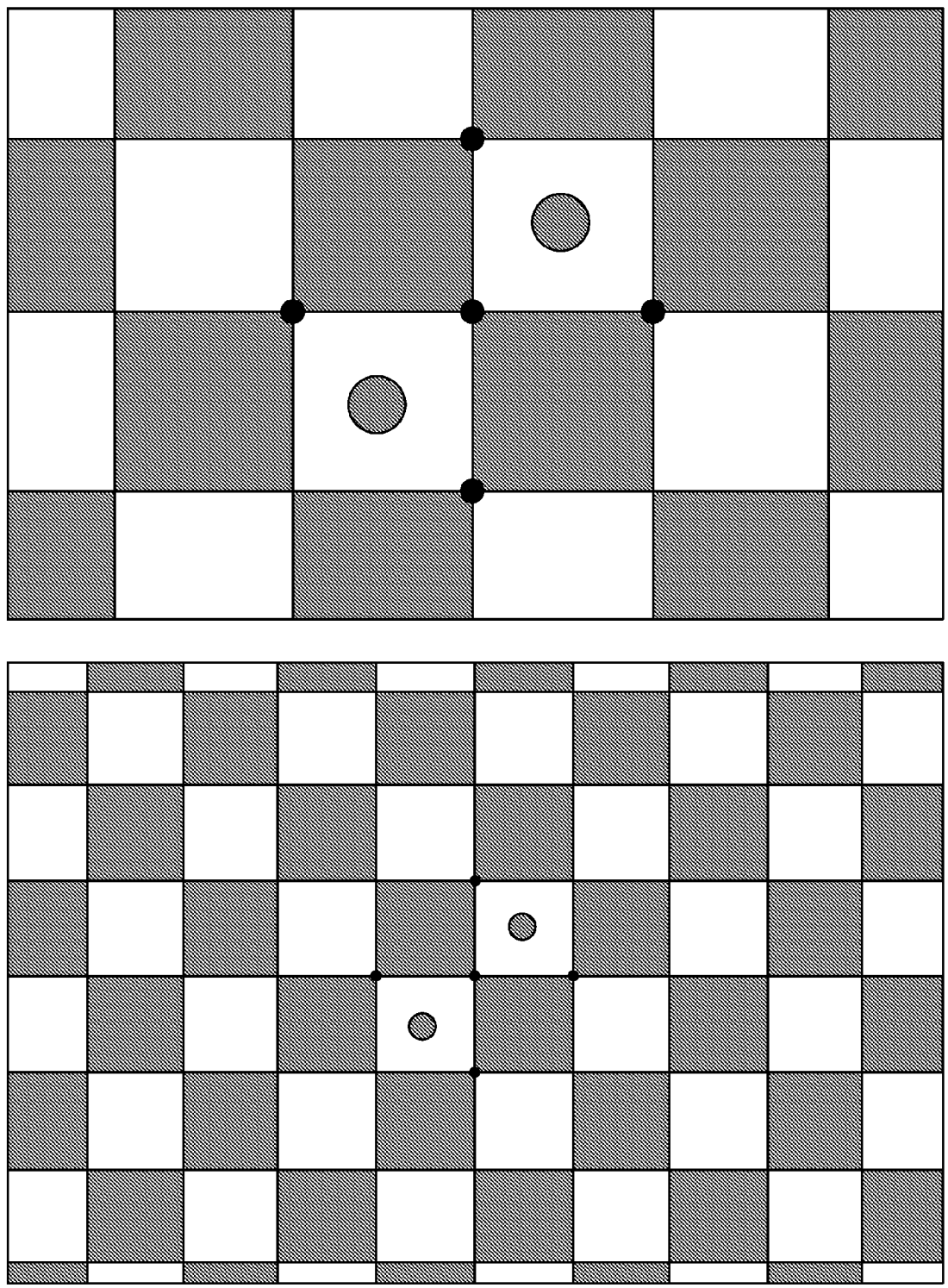
FIG. 7 illustrates a diagram of corner detection according to some embodiments.

FIG. 7 illustrates a diagram of corner detection according to some embodiments. Corners are detected in the central part of the image as lens distortion may be significant close to boundaries of the image.

Figure 8:
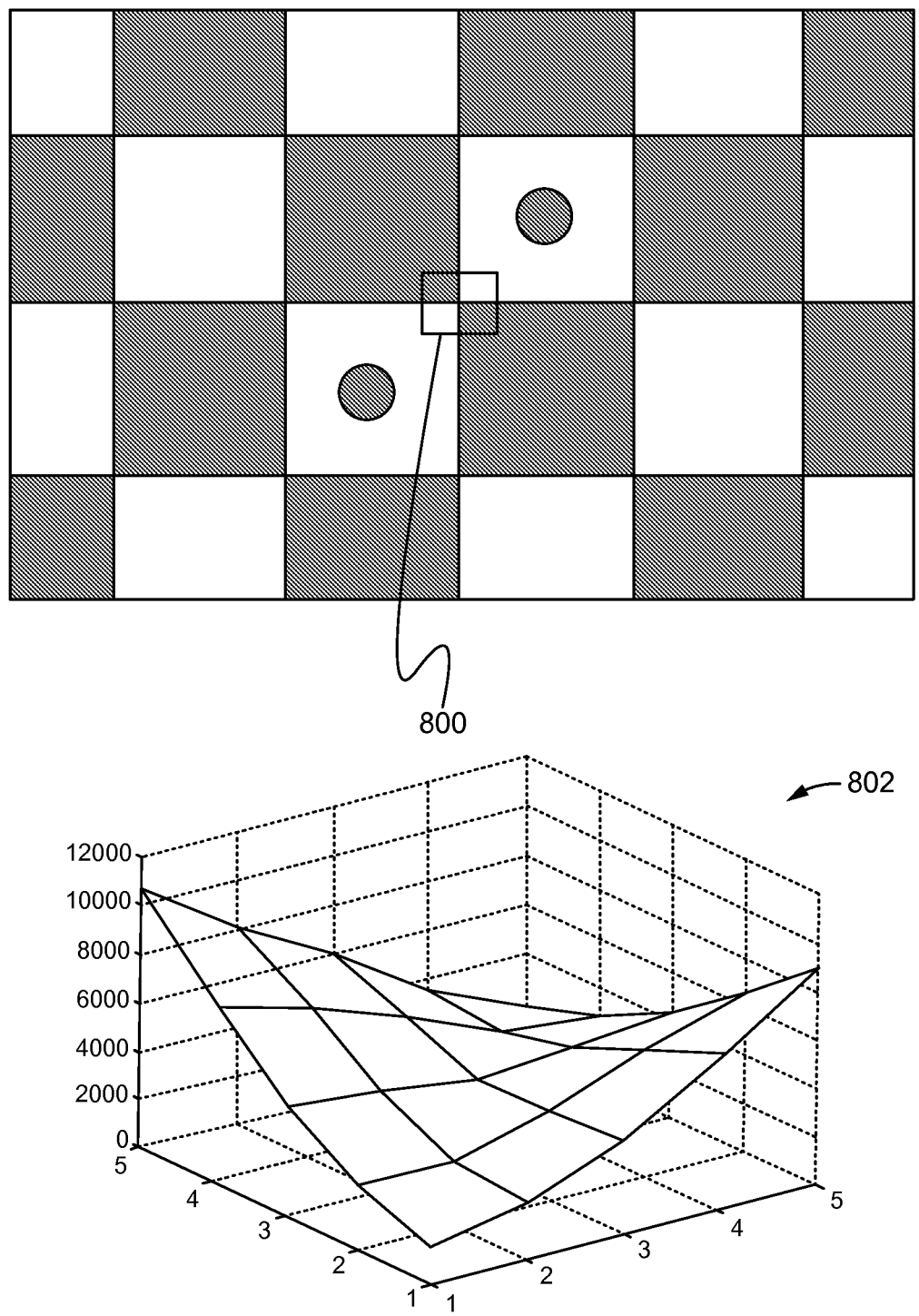
FIG. 8 illustrates a diagram of corner detection according to some embodiments.

FIG. 8 illustrates a diagram of corner detection according to some embodiments. The central box 800 indicates the local patch. The local patch surrounding an X shape corner is able to be modeled as a second order polynomial 802.

Harris corner detection (or another corner detection implementation) is used to locate the rough position of the corner. Each local patch is fit with a second order polynomial: $l(x,y) = ax^2 + bxy + cy^2 + dx + ey + f$. The saddle point of the polynomial is the corner position, and the saddle point is the solution to the following equations:

$$2ax + by + d = 0$$

$$bx + 2cy + e = 0.$$

After corner detection, the distance Di between corner points on an image is measured as pixel size is known. The square width Do on the checkerboard pattern is measured. The magnification factor m is calculated:

$m = Do/Di = u/v$

The sensor distance is calculated:

$1/f = 1/u + 1/v = 1/(mv) + 1/v.$

Figure 9:
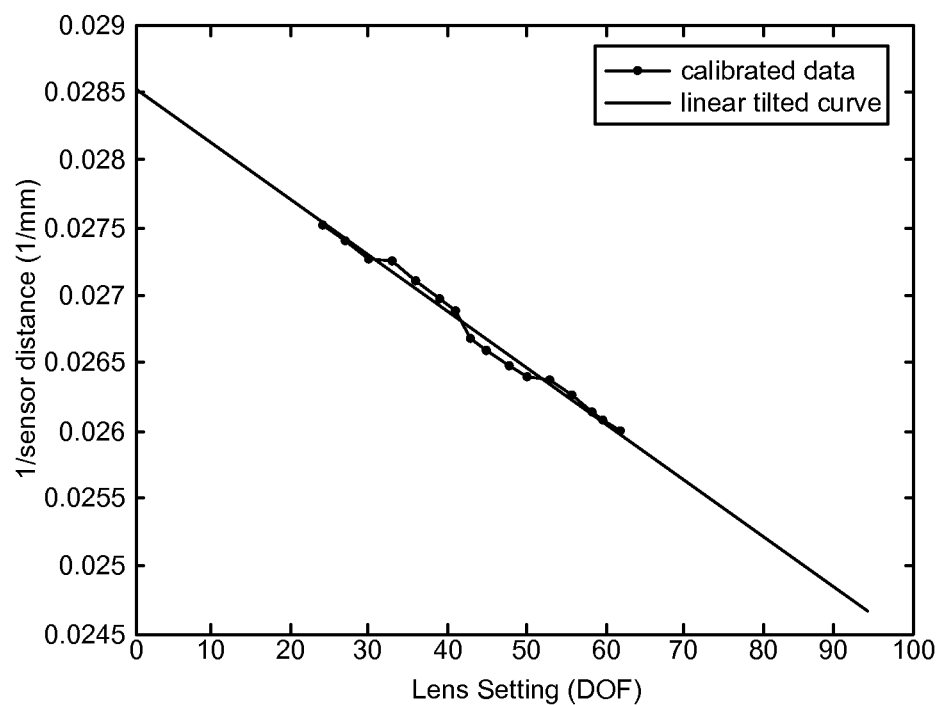
FIG. 9 illustrates an exemplary linear curve according to some embodiments.

At different depths of field, it is possible to calculate the corresponding sensor distance v. From the depth of field definition, 1/v is linear to the depth of field. From calibrated data, a linear curve is able to be fit to calculate all of the sensor distances (1/v) corresponding to each depth of field. FIG. 9 illustrates an exemplary linear curve according to some embodiments.

Previously, only the sensor distance v was calibrated for each depth of field. The distance between two nodal points N1 and N2 is able to change at different depth of field settings. Using a similar setup, nodal point distance $d_{N1N2}$ is able to be calibrated.

Figure 10:
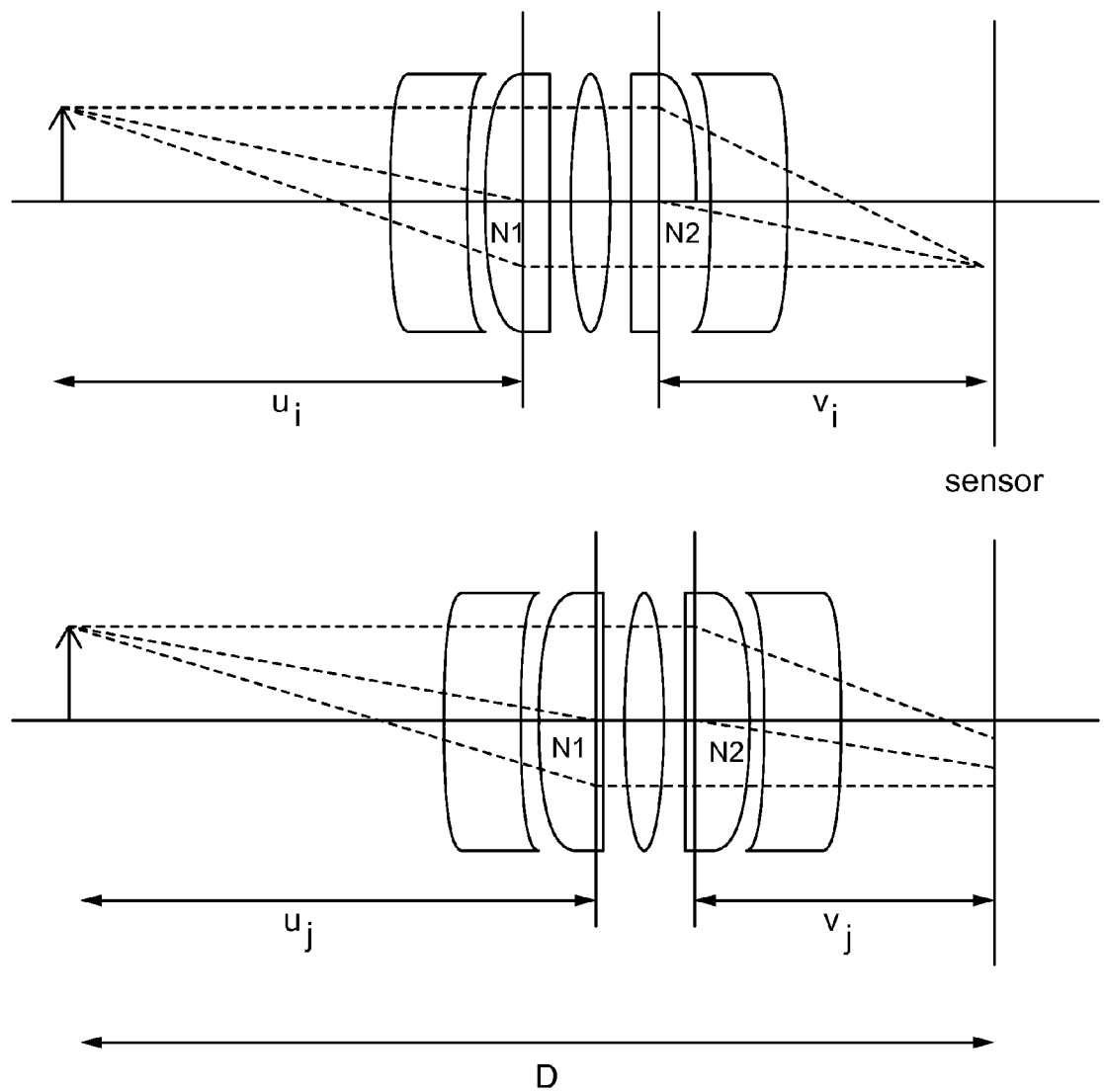
FIG. 10 illustrates a diagram of a thick lens model according to some embodiments.

FIG. 10 illustrates a diagram of a thick lens model according to some embodiments. A distance relationship is determined using a same object position and different lens settings: $u_i + d_{i,N1N2} + v_i = u_j + v_{j,N1N2} + v_j = D$; $u_i = M_i v_i$, where $M_i$ is the magnification factor. D is able to be measured, $v_i$ is calibrated, $u_i$ is able to be calibrated, hence $d_{i,N1N2}$ is able to be calculated, and should be independent of object position.

Figure 11:
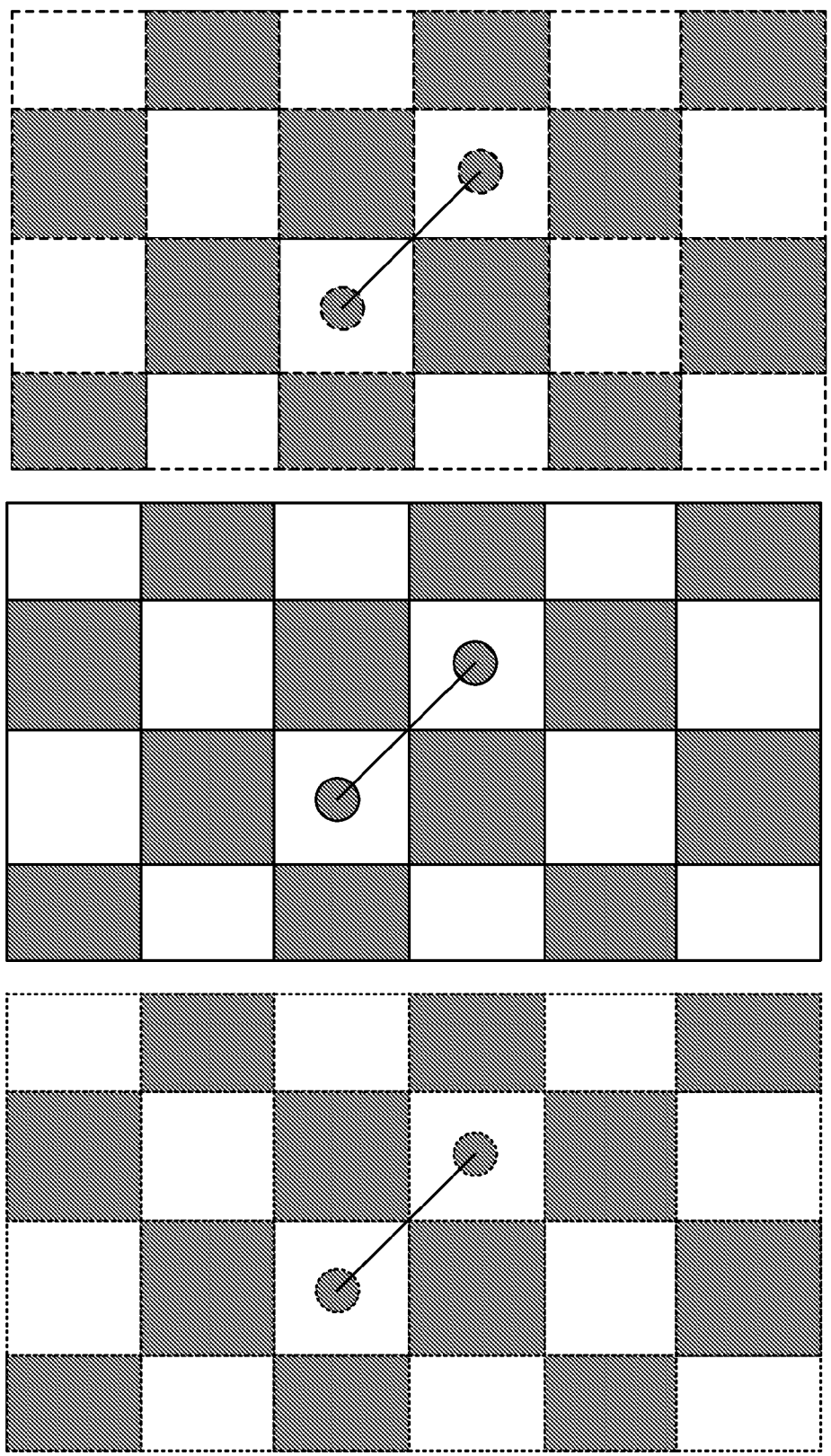
FIG. 11 illustrates exemplary checkerboards with different blur extents and different magnifications according to some embodiments.

The same checkerboard object is placed at a certain distance D, and pictures are taken with different lens settings (or different focus position). The pictures will have different blur extents, as well as different magnification. Magnification is able to be calculated by measuring the distances between the circle centers. FIG. 11 illustrates exemplary checkerboards with different blur extents and different magnifications according to some embodiments. For example, the top checkerboard and the bottom checkerboard are out of focus, and the center checkerboard is in focus.

Circle center detection is performed which includes cropping out the patch that contains the circle. The patch is convolved with itself (e.g., the correlation between the patch and its flipped version). The position of the maximal convolution result indicates the shift needed to fully match the original patch and its flipped version, hence the circle center position is able to be calculated. This works for both sharp and blurry images.

Figure 12:
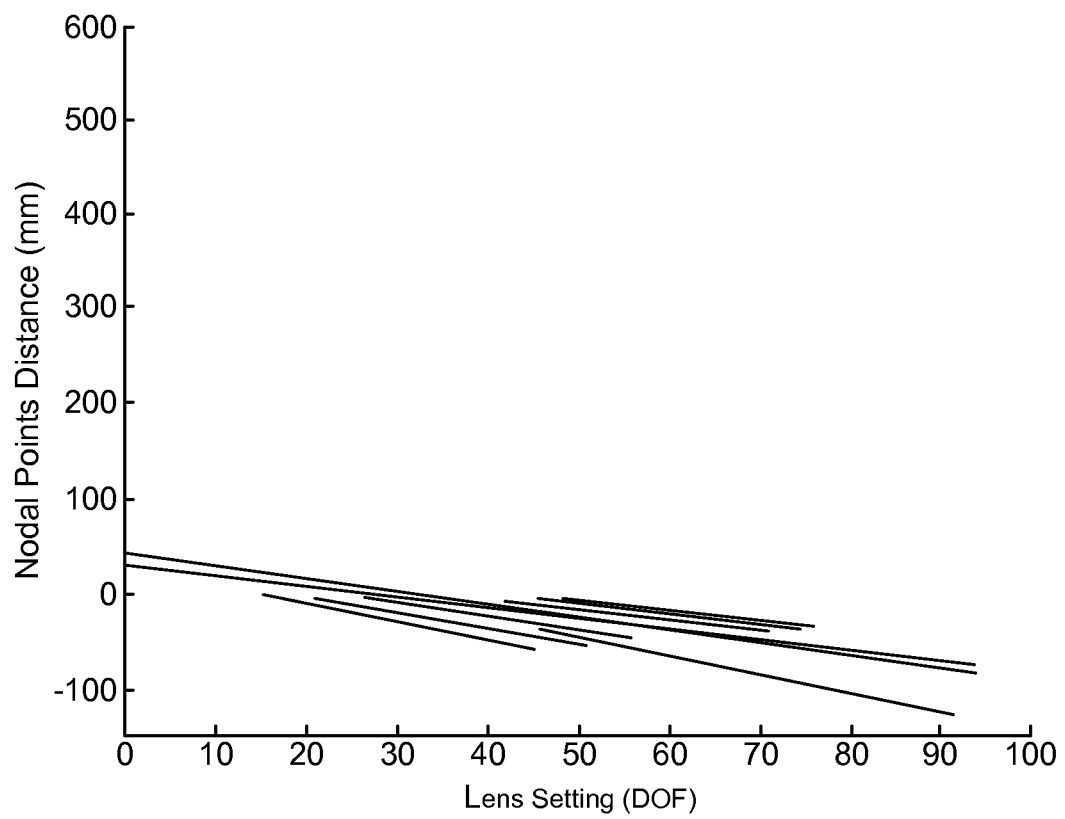
FIG. 12 illustrates a diagram of a graph of curves that show the distance calculated where the object is placed at different distances according to some embodiments.

The nodal point distance, $d_{iN1N2}$ is able to be calculated using methods described previously. The curves in FIG. 12 show the distance calculated where the object is placed at different distances. Taking the average of the $d_{iN1N2}$ is one way to generate a final result.

The method described herein is able to be utilized in many potential applications such as depth estimation from stereo or motion. Traditionally, these applications consider a camera a pin hole, where the object is considered focused at focal length f. The project between object coordinate (X, Y, Z) in 3D space and image point $(x_L, y_L)$ are able to be expressed as the following:

$$\begin{bmatrix} x_L \\ y_L \\ 1 \end{bmatrix} Z = \begin{bmatrix} f/pixelsize & 0 & Cx \\ 0 & f/pixelsize & Cy \\ 0 & 0 & 1 \end{bmatrix} \begin{bmatrix} X \\ Y \\ Z \end{bmatrix}$$

(Cx, Cy) is the image center.

Figure 13:
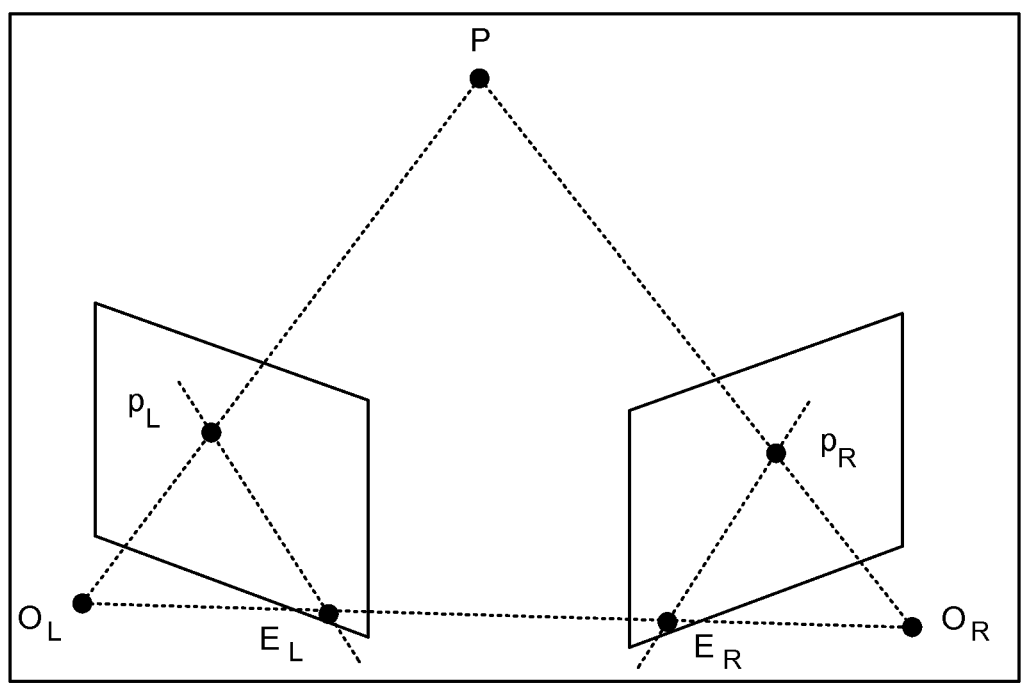
FIG. 13 illustrates a diagram of depth estimation from stereo or motion information according to some embodiments.

FIG. 13 illustrates a diagram of depth estimation from stereo or motion information according to some embodiments.

When a camera does not follow the pin hole camera, the objects are being focused at different distances, the camera model matrix is able to be adjusted to:

$$\begin{bmatrix} x_L \\ y_L \\ 1 \end{bmatrix} Z = \begin{bmatrix} v/pixelsize & 0 & Cx \\ 0 & v/pixelsize & Cy \\ 0 & 0 & 1 \end{bmatrix} \begin{bmatrix} X \\ Y \\ Z \end{bmatrix}$$

where v is the actual distance between the sensor and the second nodal point. At each individual lens setting, v is fixed. For each lens setting, v is able to be calibrated in advance and used conveniently.

When performing inverse projection in stereo or motion from structure, the depth is calculated from depth to optical center. For complex thick lenses, the distance is actually from the object to the first nodal point, and this distance varies under different lens settings. The calibrations described herein provide the distance between the sensor and the second nodal point and the distance between the two nodal points. The distance between the object and the image sensor is able to be calculated using both calibration results.

Figure 14:
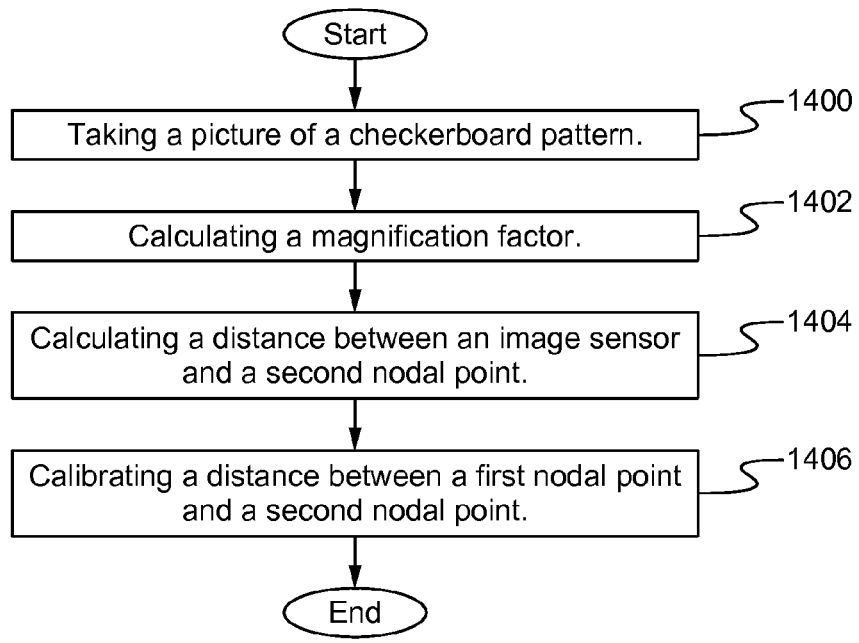
FIG. 14 illustrates a flowchart of a method of thick lens calibration according to some embodiments.

FIG. 14 illustrates a flowchart of a method of thick lens calibration according to some embodiments. In the step 1400, one or more pictures are taken of a checkerboard pattern (or another calibration image). In the step 1402, the magnification factor m is calculated by measuring the distance of two corner points on the real checkerboard and the image of the checkerboard. Any corner detection implementation (e.g., Harris corner detection) is able to be used to locate the rough position of the corner. After corner detection, the distance Di between corner points on an image is known. The square width Do on the checkerboard pattern is able to be manually measured. Then, the magnification factor m is able to be calculated using m=Do/Di. The magnification factor m also equals u/v. In the step 1404, the distance between an image sensor and the second nodal point, v, is calculated using $1/f = 1/u + 1/v = 1/(mv) + 1/v$, where m was calculated in the step 1402. At different depths of field, the corresponding sensor distance v is able to be calculated. From the depth of field definition, 1/v will be linear to the depth of field. Using limited calibrated data, a linear curve is able to be fit to calibrate all of the sensor distances corresponding to each depth of field. In the step 1406, the nodal point distance, $d_{N1N2}$, the distance between nodal points N1 and N2 is calibrated. The distance relationship is utilized, where there is a same object position but different lens settings. From this, $u_i + d_{i,N1N2} + v_i = u_j + d_{j,N1N2} + v_j = D$. Additionally, $u_i = M_i v_i$, where $M_i$ is the magnification factor. D is able to be measured, $v_i$ is calibrated, $u_i$ is able to be calibrated, hence $d_{i,N1N2}$ is able to be calculated and should be independent of object position. To calculate the magnification factor $M_i$, the same checkerboard object is placed at a certain distance D, and pictures are taken with different lens settings. The pictures will have different blur extents and different magnifications. The magnification is calculated by measuring the distances between circle centers. To measure the distances between circle centers, a patch that contains a circle is cropped out. The patch is convolved with itself. The position of the maximal convolution result indicates the shift needed to fully match the original patch and its flipped version, hence the circle center position is able to be calculated. The distance between the centers is able to be calculated. The nodal point distance, $d_{i,N1N2}$, is calculated using methods described herein (e.g., $d_{i,N1N2} = D - v_i - u_i$ or $d_{i,N1N2} = D - v_i - M_i v_i$). By taking the average of the distances calculated, a final result is generated. In some embodiments, fewer or additional steps are implemented. In some embodiments, the order of the steps is modified.

Figure 15:
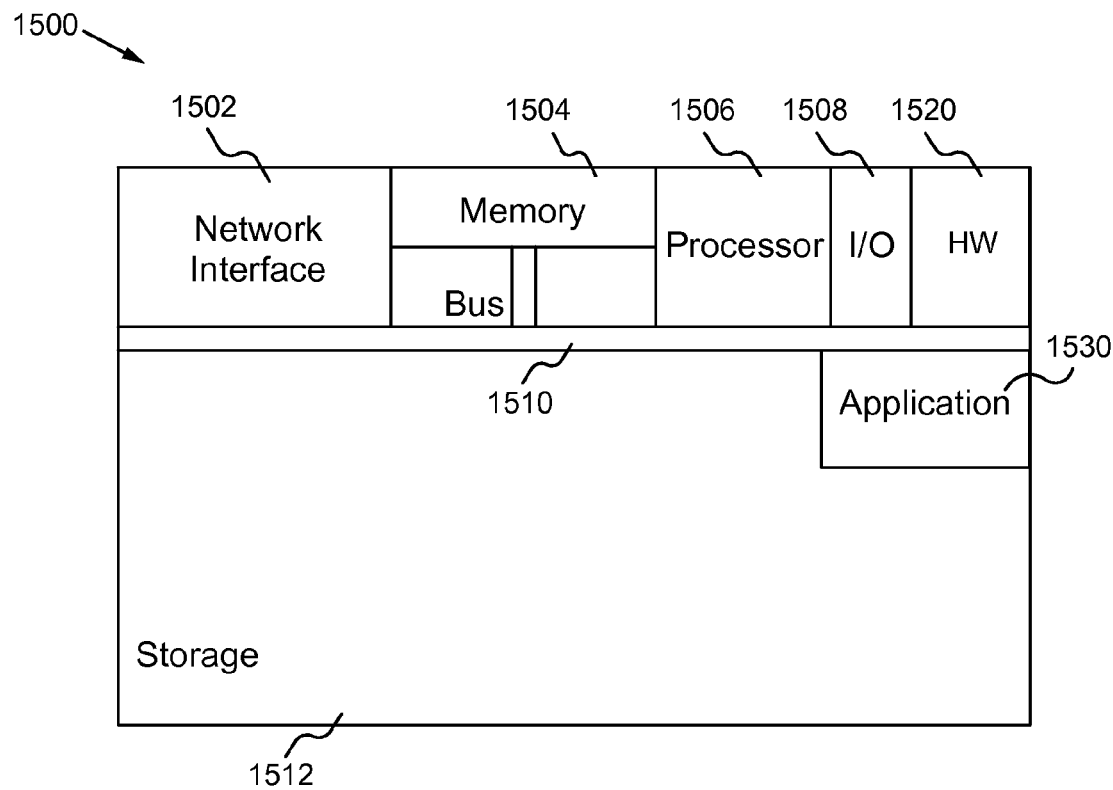
FIG. 15 illustrates a block diagram of an exemplary computing device configured to implement the thick lens calibration method according to some embodiments.

FIG. 15 illustrates a block diagram of an exemplary computing device configured to implement the thick lens calibration method according to some embodiments. The computing device 1500 is able to be used to acquire, store, compute, process, communicate and/or display information such as images and videos. In general, a hardware structure suitable for implementing the computing device 1500 includes a network interface 1502, a memory 1504, a processor 1506, I/O device(s) 1508, a bus 1510 and a storage device 1512. The choice of processor is not critical as long as a suitable processor with sufficient speed is chosen. The memory 1504 is able to be any conventional computer memory known in the art. The storage device 1512 is able to include a hard drive, CDROM, CDRW, DVD, DVDRW, High Definition disc/drive, ultra-HD drive, flash memory card or any other storage device. The computing device 1500 is able to include one or more network interfaces 1502. An example of a network interface includes a network card connected to an Ethernet or other type of LAN. The I/O device(s) 1508 are able to include one or more of the following: keyboard, mouse, monitor, screen, printer, modem, touchscreen, button interface and other devices. Thick lens calibration application(s) 1530 used to perform the thick lens calibration method are likely to be stored in the storage device 1512 and memory 1504 and processed as applications are typically processed. More or fewer components shown in FIG. 15 are able to be included in the computing device 1500. In some embodiments, thick lens calibration hardware 1520 is included. Although the computing device 1500 in FIG. 15 includes applications 1530 and hardware 1520 for the thick lens calibration method, the thick lens calibration method is able to be implemented on a computing device in hardware, firmware, software or any combination thereof. For example, in some embodiments, the thick lens calibration applications 1530 are programmed in a memory and executed using a processor. In another example, in some embodiments, the thick lens calibration hardware 1520 is programmed hardware logic including gates specifically designed to implement the thick lens calibration method.

In some embodiments, the thick lens calibration application(s) 1530 include several applications and/or modules. In some embodiments, modules include one or more sub-modules as well. In some embodiments, fewer or additional modules are able to be included.

In some embodiments, the thick lens calibration hardware 1520 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

To utilize the thick lens calibration method described herein, a device such as a digital camera is used to acquire images. The thick lens calibration method is automatically used for calibrating the camera. The thick lens calibration method is able to be implemented with user assistance or automatically without user involvement.

In operation, the thick lens calibration method enables better calibration of complex camera devices such as devices with thick lens systems. The calibrated lens parameters are able to be useful in different applications. For example, in stereo or structure from motion application, where inverse projection is performed, the difference between sensor distances and nodal point distances is compensated, and the calibration result is able to provide that.

Some Embodiments of Calibration Methods for Thick Lens Model

1. A method programmed in a non-transitory memory of a device comprising:
   a. calibrating the device using a first distance between a second nodal point and an image sensor; and
   b. calibrating the device using a second distance between a first nodal point and the second nodal point.
2. The method of clause 1 wherein the calibrating further comprises taking a picture of a checkerboard pattern.
3. The method of clause 1 wherein the calibrating further comprises calculating a magnification factor by measuring a distance of two corner points on a real checkerboard and an image of the checkerboard.
4. The method of clause 3 wherein corner detection is used to locate a rough position of the corners.
5. The method of clause 1 wherein calibrating further comprises calculating the first distance between the second nodal point and the image sensor using the magnification factor.
6. The method of clause 1 wherein calibrating further comprises fitting a linear curve to calibrate all of the sensor distances corresponding to each depth of field.
7. The method of clause 1 wherein calibrating further comprises utilizing a distance relationship, where there is a same object position but different lens settings.
8. The method of clause 7 wherein calibrating further comprises utilized a magnification factor, a distance to an object, and calibration information.
9. The method of clause 8 wherein the magnification factor is calculated using a checkerboard object at a certain distance and taking pictures with different lens settings, and the magnification factor is calculated by measuring distances between circle centers.
10. The method of clause 9 wherein measuring the distances between circle centers includes cropping out a patch that contains a circle, the patch is convolved with itself, a position of the maximal convolution result is determined, and a distance between the circle centers is measured.
11. The method of clause 1 wherein calibrating further comprises calculating the second distance between the first nodal point and the second nodal point using a distance of an object, a calibrated quantity and a calculated quantity.
12. The method of clause 11 wherein calibrating further comprises taking an average of second distances calculated and generating a final result.
13. A system comprising:
   a. a lens;
   b. an image sensor configured for acquiring an image; and
   c. a processing component configured for calibrating the system using a first distance between a second nodal point and the image sensor, and calibrating the system using a second distance between a first nodal point and the second nodal point.
14. The system of clause 13 wherein the calibrating further comprises taking a picture of a checkerboard pattern.
15. The system of clause 13 wherein the calibrating further comprises calculating a magnification factor by measuring a distance of two corner points on a real checkerboard and an image of the checkerboard.

16. The system of clause 15 wherein corner detection is used to locate a rough position of the corners.

17. The system of clause 13 wherein calibrating further comprises calculating the first distance between the second nodal point and the image sensor using the magnification factor.

18. The system of clause 13 wherein calibrating further comprises fitting a linear curve to calibrate all of the sensor distances corresponding to each depth of field.

19. The system of clause 13 wherein calibrating further comprises utilizing a distance relationship, where there is a same object position but different lens settings.

20. The system of clause 19 wherein calibrating further comprises utilized a magnification factor, a distance to an object, and calibration information.

21. The system of clause 20 wherein the magnification factor is calculated using a checkerboard object at a certain distance and taking pictures with different lens settings, and the magnification factor is calculated by measuring distances between circle centers.

22. The system of clause 21 wherein measuring the distances between circle centers includes cropping out a patch that contains a circle, the patch is convolved with itself, a position of the maximal convolution result is determined, and a distance between the circle centers is measured.

23. The system of clause 13 wherein calibrating further comprises calculating the second distance between the first nodal point and the second nodal point using a distance of an object, a calibrated quantity and a calculated quantity.

24. The system of clause 23 wherein calibrating further comprises taking an average of second distances calculated and generating a final result.

25. A camera device comprising:
   a. a lens;
   b. a sensor configured for acquiring an image;
   c. a non-transitory memory for storing an application, the application for:
      i. calibrating the system using a first distance between a second nodal point and the image sensor; and
      ii. calibrating the system using a second distance between a first nodal point and the second nodal point; and
   d. a processing component coupled to the memory, the processing component configured for processing the application.

26. The camera device of clause 25 wherein the calibrating further comprises taking a picture of a checkerboard pattern.

27. The camera device of clause 25 wherein the calibrating further comprises calculating a magnification factor by measuring a distance of two corner points on a real checkerboard and an image of the checkerboard.

28. The camera device of clause 27 wherein corner detection is used to locate a rough position of the corners.

29. The camera device of clause 25 wherein calibrating further comprises calculating the first distance between the second nodal point and the image sensor using the magnification factor.

30. The camera device of clause 25 wherein calibrating further comprises fitting a linear curve to calibrate all of the sensor distances corresponding to each depth of field.

31. The camera device of clause 25 wherein calibrating further comprises utilizing a distance relationship, where there is a same object position but different lens settings.

32. The camera device of clause 31 wherein calibrating further comprises utilized a magnification factor, a distance to an object, and calibration information.

33. The camera device of clause 32 wherein the magnification factor is calculated using a checkerboard object at a certain distance and taking pictures with different lens settings, and the magnification factor is calculated by measuring distances between circle centers.

34. The camera device of clause 33 wherein measuring the distances between circle centers includes cropping out a patch that contains a circle, the patch is convolved with itself, a position of the maximal convolution result is determined, and a distance between the circle centers is measured.

35. The camera device of clause 25 wherein calibrating further comprises calculating the second distance between the first nodal point and the second nodal point using a distance of an object, a calibrated quantity and a calculated quantity.

36. The camera device of clause 35 wherein calibrating further comprises taking an average of second distances calculated and generating a final result.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   a. calibrating the device using a first distance between a second nodal point and an image sensor; and
   b. calibrating the device using a second distance between a first nodal point and the second nodal point, wherein calibrating the device includes moving one or more lenses based on the second nodal point and the image sensor, wherein calibrating further comprises utilizing a distance relationship, where there is a same object position but different lens settings, wherein calibrating further comprises utilizing a magnification factor, a distance to an object, and calibration information, wherein the magnification factor is calculated using a checkerboard object at a certain distance and taking pictures with the different lens settings, and the magnification factor is calculated by measuring distances between circle centers in the checkerboard object, wherein measuring the distances between the circle centers includes cropping out a patch that contains a circle, the patch is convolved with itself, a position of the maximal convolution result is determined, and a distance between the circle centers is measured.

2. The method of claim 1 wherein the calibrating further comprises taking a picture of a checkerboard pattern.

3. The method of claim 1 wherein the calibrating further comprises calculating a magnification factor by measuring a first distance of two corner points on a real checkerboard and a second distance of two corner points on an image of the checkerboard.

4. The method of claim 3 wherein corner detection is used to locate rough position of the corner points.

5. The method of claim 3 wherein calibrating further comprises calculating the first distance between the second nodal point and the image sensor using the magnification factor.

6. The method of claim 1 wherein calibrating further comprises fitting a linear curve to calibrate all sensor distances corresponding to each depth of field.

7. The method of claim 1 wherein calibrating further comprises calculating the second distance between the first nodal point and the second nodal point using a distance of an object, a calibrated quantity and a calculated quantity.

8. The method of claim 7 wherein calibrating further comprises calculating additional second distances and taking an average of the second distances calculated and generating a final result.

9. A system comprising:
a. a lens;
b. an image sensor configured for acquiring an image; and
c. a processor configured for calibrating the system using a first distance between a second nodal point and the image sensor, and calibrating the system using a second distance between a first nodal point and the second nodal point, wherein calibrating the system includes moving the lens based on the second nodal point and the image sensor, wherein calibrating further comprises utilizing a distance relationship, where there is a same object position but different lens settings, wherein calibrating further comprises utilizing a magnification factor, a distance to an object, and calibration information, wherein the magnification factor is calculated using a checkerboard object at a certain distance and taking pictures with the different lens settings, and the magnification factor is calculated by measuring distances between circle centers in the checkerboard object, wherein measuring the distances between the circle centers includes cropping out a patch that contains a circle, the patch is convolved with itself, a position of the maximal convolution result is determined, and a distance between the circle centers is measured.

10. The system of claim 9 wherein the calibrating further comprises taking a picture of a checkerboard pattern.

11. The system of claim 9 wherein the calibrating further comprises calculating a magnification factor by measuring a first distance of two corner points on a real checkerboard and a second distance of two corner points on an image of the checkerboard.

12. The system of claim 11 wherein corner detection is used to locate rough position of the corner points.

13. The system of claim 11 wherein calibrating further comprises calculating the first distance between the second nodal point and the image sensor using the magnification factor.

14. The system of claim 9 wherein calibrating further comprises fitting a linear curve to calibrate all sensor distances corresponding to each depth of field.

15. The system of claim 9 wherein calibrating further comprises calculating the second distance between the first nodal point and the second nodal point using a distance of an object, a calibrated quantity and a calculated quantity.

16. The system of claim 15 wherein calibrating further comprises calculating additional second distances and taking an average of the second distances calculated and generating a final result.

17. A camera device comprising:
a. a lens;
b. a sensor configured for acquiring an image;
c. a non-transitory memory for storing an application, the application for:
i. calibrating the camera device using a first distance between a second nodal point and the image sensor; and
ii. calibrating the camera device using a second distance between a first nodal point and the second nodal point, wherein calibrating the camera device includes moving the lens based on the second nodal point and the image sensor, wherein calibrating further comprises utilizing a distance relationship, where there is a same object position but different lens settings, wherein calibrating further comprises utilizing a magnification factor, a distance to an object, and calibration information, wherein the magnification factor is calculated using a checkerboard object at a certain distance and taking pictures with the different lens settings, and the magnification factor is calculated by measuring distances between circle centers in the checkerboard object, wherein measuring the distances between the circle centers includes cropping out a patch that contains a circle, the patch is convolved with itself, a position of the maximal convolution result is determined, and a distance between the circle centers is measured; and
d. a processor coupled to the memory, the processor configured for processing the application.

18. The camera device of claim 17 wherein the calibrating further comprises taking a picture of a checkerboard pattern.

19. The camera device of claim 17 wherein the calibrating further comprises calculating a magnification factor by measuring a first distance of two corner points on a real checkerboard and a second distance of two corner points on an image of the checkerboard.

20. The camera device of claim 19 wherein corner detection is used to locate rough position of the corner points.

21. The camera device of claim 19 wherein calibrating further comprises calculating the first distance between the second nodal point and the image sensor using the magnification factor.

22. The camera device of claim 17 wherein calibrating further comprises fitting a linear curve to calibrate all sensor distances corresponding to each depth of field.

23. The camera device of claim 17 wherein calibrating further comprises calculating the second distance between the first nodal point and the second nodal point using a distance of an object, a calibrated quantity and a calculated quantity.

24. The camera device of claim 23 wherein calibrating further comprises calculating additional second distances and taking an average of the second distances calculated and generating a final result.

* * * * *